United States Patent Office 3,410,657
Patented Nov. 12, 1968

3,410,657
CATALYTIC PROCESS AND COMPOSITION FOR THE PRODUCTION OF AMMONIA AND CHLORINE FROM AMMONIUM CHLORIDE
Roger Botton, Paris, and André Steinmetz, Aubervilliers, France, assignors to Produits Chimiques Pechiney Saint-Gobain, Paris, France
No Drawing. Filed Nov. 13, 1964, Ser. No. 411,096
Claims priority, application France, Nov. 15, 1963, 953,930
14 Claims. (Cl. 23—193)

ABSTRACT OF THE DISCLOSURE

A catalytic composition and method of use thereof, particularly suitable for the decomposition of $NH_4Cl$ into $NH_3$ and $Cl$, consisting in its essential ingredients, a partly reduced iron oxide, a potassium halide, and copper chloride.

This invention is an improvement over that which is described in U.S. patent application Ser. No. 283,684. In that case there is described a process for preparing ammonia and chlorine gas from ammonium chloride by decomposing ammonium chloride in contact with an active and easily regenerable catalytic mass, the principal constituents of which are a partially reduced metal oxide and an alkali metal salt. That catalytic mass preferably consists of a partly reduced sesquioxide of iron or of manganese in association with potassium chloride in quantities such that the mole ratio of KCl to the partly reduced oxide lies between about .3 and about .4. The catalytic mass may contain partially reduced oxides of the iron family, that is to say iron, and cobalt, nickel and manganese, which have physical constitution and chemical properties similar to those of iron. The sesquioxides of these metals, partially reduced, are preferred. The alkali metal halides all have some utility but potassium chloride is preferred. In the former process it is also satisfactory to use an inert diluent, such as silica, and an activator from the class of salts of rare earth metals, in the catalyst.

In the former process the catalytic mass is activated by a current of reductive gas such as carbon oxide or illuminating gas, so as to partially reduce the metal oxides. This partially reduced catalyst is mixed with ammonium chloride which liberates ammonia and fixes hydrochloric acid in the catalytic mass. The ammonia is recovered as it is released, using standard techniques for the recovery of ammonia gas, and, after the ammonia has been recovered, the catalytic mass containing the hydrochloric acid is treated with an oxidizing gas, for instance oxygen, air, or superoxygenated air, which liberates the elemental chlorine. The catalytic mass is then ready for reuse.

It is an object of the invention to improve the process of application Ser. No. 283,684, to obtain higher yields of chlorine and ammonia from that process, to minimize the release of HCl gas from the catalyst, and to reduce or eliminate the corrosion of the equipment caused by HCl in the gas product. Another object is to recover the chlorine, which was previously lost as byproduct ammonium chloride, in the ammonia process for the preparation of sodium carbonate.

The objects of the invention are accomplished, generally speaking, by a catalytic composition effective in the dissociation of $NH_4Cl$ which comprises a partly reduced metal oxide of the class consisting of Fe, Mn, Co, and Ni, an alkali metal halide, a readily oxidizable copper salt, and permissibly an activator from the class of rare earth element salts, of which the activator may or may not be present, and to which an inert diluent may be added.

In conformity with the present invention the reaction described in the previous case proceeds better and achieves the objects of this invention if a copper compound is added to the catalytic mass. The preferred copper compound is cuprous chloride, which is exemplary of the class of copper compounds, especially organic or inorganic salts, which are readily oxidized or chlorinated. In use, the cuprous chloride bears the mole ratio to the metal oxide of the iron family of about .3 to about 1, and the potassium chloride in the same composition bears the mole ratio to the metal oxide catalyst of about .2 to about 2.5.

In carrying out the invention the catalyst is made by the process described in Example 1 hereof; it is mixed with ammonium chloride, a reducing gas is passed through it, liberating ammonia, an oxidizing gas is passed through the catalytic mass, liberating chlorine in elemental form, and the oxidized catalyst may be generated by a reducing gas for use in a subsequent operation.

In a preferred form of the invention, the catalytic mass is principally composed of a partially reduced metal oxide, especially a partially reduced sesquioxide of iron ($Fe_2O_3$) or of manganese ($Mn_2O_3$), of cuprous chloride or other copper compounds which are susceptible of being oxidized or chlorinated readily, for instance cuprous oxide, cupric oxide, copper citrate or copper tartrate and of potassium chloride or (less preferred) other alkali metal chlorides.

As may be advantageous, one may add a catalyst activator such as one or more of the salts of the rare earth metals cerium, lanthanum, praseodymium and samarium. Among the salts of this group which are preferred are praseodymium and samarium oxides or chlorides.

This catalytic mass can sometimes be helpfully extended by the addition of a chemically inert diluent such as silica.

The following is a general description of an exemplary process.

The catalytic mass, prepared as in Example 1, is activated at a temperature between 500–530° C., by a current of reducing gas, for example, illuminating gas, the reduction being terminated while it is still partial. The ammonium chloride is brought into contact with the activated catalyst at a temperature between 360–420° C. and the ammonia liberated is removed by a current of inert gas such as nitrogen, or by a current of reducing gas such as carbon oxide. During this operation hydrochloric acid is formed and fixed in the catalytic mass.

When the liberation of ammonia ends, the chlorinated catalytic mass is oxygenated by passing a current of oxygen or superoxygenated air through it, which raises the temperature in the mass by the oxidation of chlorides and of the reduced oxides which have not been transformed, then the temperature is raised to 480–520° C. while still passing the oxidizing gas through it and this liberates the chlorine from the metallic chlorides. The gas thus obtained is high in chlorine and contains practically no hydrochloric acid. This operation is preferably arrested before the complete dechlorination of the catalytic mass in order that the carrier gas shall have a high chlorine content. The metallic chlorides which are not decomposed are not separated from the catalytic mass, but proceed with it to the next cycle. This invention produces yields of ammonia better than 98% and yields of chlorine gas superior to 90% in the first treatment of the catalytic mass. The gasses obtained during the dechlorination by means of oxygen contain an average of more than 60% of chlorine, their content of hydrochloric acid is very low, and this solves the problems which arise in metallic apparatus from the presence of hydrochloric acid.

This process can be put into operation in a semi-continuous way by disposing several reactors in parallel in which the different steps of the process are carried out simultaneously and/or successively.

It applies particularly well to recovering the ammonia and chlorine from the ammonium chloride which is a byproduct of the ammonia process for producing sodium carbonate. It permits one to save, as a gas of high chlorine content, chlorine which would otherwise be lost as calcium chloride.

The following examples illustrate the invention without limiting the generality of what has elsewhere herein been stated.

Example 1

A powder mixer of rotating blade type receives 24.6 g. of $Fe_2O_3$, 15.45 g. of CuCl, 28.25 g. of KCl, and 50.1 g. of fine silica. This catalytic mass is placed in a vertical tube which is electrically heated to a temperature of 530° C. and a current of illuminating gas is passed through the tube at a rate of 10 liters in 35 minutes. The catalytic mass, thus reduced, is protected from contact with the atmosphere and 30 g. of ammonium chloride are mixed with it. The resulting solid is put into an identical reactor and the temperature is raised to 400–420° C., nitrogen is flowed through the mass in the reactor at the rate of 2 liters per hour, and the nitrogen with its ammonia content flows to typical ammonia recovery apparatus. There is thus produced in 2½ hours 9.42 g. of ammonia corresponding to 98.8% of ammonia based on the ammonium chloride present in the reaction.

When the release of ammonia stops, a current of dry oxygen is passed through the reactor at 8 liters per hour for 20 minutes, the temperature is kept between 480–490° C. during the passage of the oxygen. The temperature is raised to 500–520° C. while continuing the flow of oxygen at a rate of 4 liters per hour, and 16.9 g. of chlorine (85% of the quantity in the ammonium chloride) is recovered at a mean concentration of 68% in the gas. The content of hydrochloric acid in the gas is less than 1% of the volume of the gas.

By comparison, when proceeding according to the former case, containing no copper salt, the dechlorination step produces gas containing only 45% chlorine on the average.

Example 2

The catalytic mass is prepared from 71 g. of iron sesquioxide, 20.6 g. of cuprous chloride, 23.6 g. of potassium chloride and 67 g. of anhydrous alumina $Al_2O_3$. This catalyst is used as in Example 1 after admixture with 30 g. of ammonium chloride. The catalytic mass resulting from the operation is thereafter recycled and put into use in a second identical operation, the results of which are set forth in the following table:

TABLE I

| Test No. | $NH_4Cl$ in grams | Yield in $NH_3$, percent | Yield in $Cl_2$, percent | Content of Gas in $Cl_2$, Vol. percent per Vol. |
|---|---|---|---|---|
| 1 | 30 | 100 | 78.3 | 64.5 |
| 2 | 30 | 98.9 | 100 | |

During the first operation different fractions of the gas containing chlorine are extracted and the content of each fraction is indicated in Table II, comparative to the cumulated yield of chlorine liberated with respect to the quantity of chlorine in the ammonium chloride.

TABLE II

| No. of the Fractions | Percent by Vol. of Chlorine With Respect to the Vol. of the Gas | Cumulated Yield of Chlorine in percent |
|---|---|---|
| 1 | 96.5 | 57.1 |
| 2 | 62.2 | 74.2 |
| 3 | 14.1 | 76.7 |
| 4 | 8.8 | 78.3 |

All these fractions contain less than 1% of hydrochloric acid per volume.

The advantages of the invention consist largely in obtaining the objects of the invention as described hereinabove.

As many apparently widely different embodiments of the present invention may be made without departing from the spirit and scope thereof, it is to be understood that the invention is not limited to the specific embodiments.

Example 3

The catalytic mass is prepared from 82.5 g. of iron sesquioxide, 15 g. of cuprous chloride, 27 g. of potassium chloride, 3.5 g. of praseodymium oxide $Pr_2O_3$ and 74 g. of alumina. This catalytic mass is used as in Example 1 after admixture with 30 g. of ammonium chloride. There is produced 9.5 g. of ammonia corresponding to the whole of ammonia based on the ammonium chloride and a first fraction of 14.6 g. of chlorine, 77.9% in concentration, corresponding to 73.5% of chlorine based on the ammonium chlorine present in the reaction.

Example 4

The conditions of Example 3 are duplicated but with 7 g. of samarium oxide $Sm_2O_3$ instead of $Pr_2O_3$. 9.5 g. of ammonia corresponding to the whole of ammonia based on the ammonium chloride is produced. There is collected a first fraction of 14.5 g. of chlorine, 78% in concentration corresponding to 73% of the quantity in ammonium chloride.

What is claimed is:

1. A catalytic composition for the preparation of ammonia and chlorine from ammonium chloride which consists essentially of a sesquioxide of a metal selected from the class consisting of Fe, Mn, Co and Ni, potassium chloride and copper chloride, in which the composition has been partly reduced to an active state, and in which the mole ratio of copper chloride to the sesquioxide is between about 0.3 and 1, and the mole ratio of potassium chloride to the sesquioxide is between 0.2 and about 2.5.

2. A catalytic composition for the preparation of ammonia and chlorine from ammonium chloride which consists essentially of partly reduced iron sesquioxide, potassium chloride, and copper chloride in which the mole ratio of copper chloride to iron sesquioxide is between about 0.3 and about 1 and the mole ratio of potassium chloride to iron sesquioxide is between about 0.2 and about 2.5.

3. A catalytic composition as set forth in claim 1 in which the metal oxide is manganese oxide.

4. A catalytic composition as set forth in claim 1 in which the composition contains an activator containing a rare earth metal compound.

5. A method for the preparation of ammonia and chlorine from ammonium chloride, which comprises heating a composition consisting essentially of a sesquioxide of a metal selected from the class consisting of Mn, Fe, Co, and Ni, potassium chloride and cuprous chloride, in which the mole ratio of cuprous chloride to sesquioxide is about 0.3 to about 1, and the mole ratio of potassium chloride to sesquioxide is about 0.2 to about 2.5, in the presence of a reducing gas to partly reduce the composition to a more active form, contacting the composition while in this active form with ammonium chloride at a temperature of 360–420° C. and removing the ammonia released, contacting the remaining composition with an oxidizing agent at a temperature of about 480–520° C. and recovering substantially all of the chlorine contained in the ammonium chloride as a gas of high purity.

6. A method according to claim 5 in which the composition also contains a rare earth compound.

7. A method according to claim 5 in which the oxidizing agent is reactive oxygen.

8. A method according to claim 7 in which the sesquioxide is iron sesquioxide.

9. A method of preparing ammonia and chlorine gas from ammonium chloride, which comprises partially reducing a catalyst consisting essentially of a sesquioxide of a metal selected from the class of Mn, Fe, Co, and Ni, potassium chloride, and readily oxidizable copper compound in which the mole ratio of the copper compound to the sesquioxide is from about 0.3 to 1 and the mole ratio of potassium chloride to sesquioxide is between 0.2 and 2.5, by heating it in admixture with a reducing gas at about 500–530° C., contacting ammonium chloride therewith at about 360–420° C., sweeping liberated $NH_3$ away with a current of gas, oxidizing the catalyst at about 480–520° C., to remove chlorine gas in high concentration, and recovering the liberated ammonia and chlorine separately.

10. A method of preparing ammonia and chlorine from ammonium chloride which comprises partially reducing a mixture of a sesquioxide of a metal selected consisting of Mn, Fe, Co and Ni, an alkali metal chloride, and a copper compound which is readily transformed to copper oxide and copper chloride, in which the mole ratio of the copper compound to sesquioxide is between about 0.3 and about 1, and the mole ratio of alkali chloride and the sesquioxide is between about 0.2 and 2.5 at a temperature of about 500–530° C. mixing ammonium chloride therewith, heating the mass at the temperature of dissociation of ammonium chloride, recovering liberated ammonia, oxidizing the catalyst and recovering liberated chlorine in concentrated form.

11. A method according to claim 10 in which the sesquioxide is manganese.

12. A catalyst according to claim 1 containing a diluent selected from the group consisting of silica and alumina.

13. The catalyst of claim 12 and $Pr_2O_3$.

14. The catalyst of claim 12 and $Sm_2O_3$.

References Cited

UNITED STATES PATENTS

| | | | |
|---|---|---|---|
| 379,488 | 3/1888 | Mond | 23—193 |
| 2,542,464 | 2/1951 | Black et al. | 252—441 |
| 3,260,678 | 7/1966 | Engel et al. | 23—219 |
| 3,324,046 | 6/1967 | Diprose | 252—441 |

EDWARD J. MEROS, *Primary Examiner.*

H. S. MILLER, *Assistant Examiner.*